(12) United States Patent
Asano et al.

(10) Patent No.: US 8,131,654 B2
(45) Date of Patent: Mar. 6, 2012

(54) SYSTEM AND METHOD FOR DIMENSIONAL RATING OF MAIL PIECES

(75) Inventors: David K. Asano, Easton, CT (US); Jean-Hiram Coffy, Norwalk, CT (US); Michael P. Swenson, Danbury, CT (US); Alexandra Mack, Monroe, CT (US); David W. Beckstrom, Milford, CT (US); Joan T. Doutney, Sandy Hook, CT (US); Sarah Jurta, Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 322 days.

(21) Appl. No.: 12/332,482

(22) Filed: Dec. 11, 2008

(65) Prior Publication Data

US 2010/0153309 A1 Jun. 17, 2010

(51) Int. Cl.
*G01G 19/413* (2006.01)
(52) U.S. Cl. .......................................... 705/407
(58) Field of Classification Search .................. None
See application file for complete search history.

(56) References Cited

U.S. PATENT DOCUMENTS

| | | | |
|---|---|---|---|
| 4,929,843 A | 5/1990 | Chmielewski, Jr. et al. |
| 5,121,328 A | 6/1992 | Sakai et al. |
| 5,142,482 A | 8/1992 | Sansone |
| 5,236,072 A | 8/1993 | Cargill |
| 5,238,123 A | 8/1993 | Tovini |
| 5,539,675 A | 7/1996 | Carroll, Sr. et al. |
| 5,734,476 A | 3/1998 | Dlugos |
| 5,770,864 A | 6/1998 | Dlugos |
| 5,777,746 A | 7/1998 | Dlugos |
| 5,793,652 A | 8/1998 | DeBarber et al. |
| 5,808,912 A | 9/1998 | Dlugos et al. |
| 5,815,274 A | 9/1998 | Dlugos |
| 5,841,541 A | 11/1998 | Dlugos |
| 5,878,379 A | 3/1999 | Dlugos et al. |
| 5,909,013 A | 6/1999 | Dlugos |
| 5,914,463 A | 6/1999 | Dlugos |
| 6,006,210 A | 12/1999 | Freeman et al. |
| 6,135,292 A | 10/2000 | Pettner |
| 6,502,756 B1 | 1/2003 | Fahraeus |
| 6,586,930 B1 | 7/2003 | Kumar et al. |

(Continued)

OTHER PUBLICATIONS

"Mail Room Equipment for the In-Plant", In-Plant Printer, v44n6, Nov./Dec. 2004.*

*Primary Examiner* — Rutao Wu
(74) *Attorney, Agent, or Firm* — George M. Macdonald; Charles R. Malandra, Jr.; Steven J. Shapiro

(57) ABSTRACT

Systems and methods for dimensionally rating mail pieces including cards, letters, flats, mailers, packages and parcels using a pointing device such as a digital pen are described. In one illustrative configuration the system includes a digital pen, a three dimensional digital pen pattern device, a computer and a printer for printing evidence of postage payment. A mail piece such as a small parcel is placed on the opened three dimensional digital pen pattern device. The user may select a digital pen pattern command box or may otherwise engage or be prompted to begin measurements. For a rectangular parcel, the user selects a bottom right and then a top left measurement point. The system then calculates the dimensions of the parcel, dimensionally rates it and then accounts for and prints a corresponding postage indicium.

20 Claims, 5 Drawing Sheets

U.S. PATENT DOCUMENTS

| | | |
|---|---|---|
| 6,655,683 B2 | 12/2003 | Engarto et al. |
| 6,798,528 B1 | 9/2004 | Hartman |
| 6,832,213 B2 | 12/2004 | Freeman et al. |
| 6,915,281 B2 | 7/2005 | Coffy et al. |
| 7,082,444 B2 | 7/2006 | Braun et al. |
| 7,110,576 B2 | 9/2006 | Norris, Jr. et al. |
| 7,162,459 B2 | 1/2007 | Massucci et al. |
| 7,167,586 B2 | 1/2007 | Braun et al. |
| 7,254,506 B2 * | 8/2007 | McMurtry et al. .............. 702/95 |
| 7,343,042 B2 | 3/2008 | Braun et al. |
| 7,373,722 B2 * | 5/2008 | Cooper et al. .................. 33/1 V |
| 7,397,468 B2 | 7/2008 | Braun et al. |
| 7,404,521 B2 | 7/2008 | Parkos et al. |
| 2002/0048404 A1 * | 4/2002 | Fahraeus et al. .............. 382/188 |
| 2002/0057824 A1 | 5/2002 | Andreasson |
| 2004/0128264 A1 | 7/2004 | Leung et al. |
| 2004/0151068 A1 * | 8/2004 | Carlsruh et al. ................ 367/99 |
| 2004/0230542 A1 | 11/2004 | Obrea |
| 2005/0080749 A1 * | 4/2005 | Kummer et al. .............. 705/400 |
| 2006/0075340 A1 | 4/2006 | Coffy |
| 2006/0112023 A1 | 5/2006 | Horhann et al. |
| 2007/0089529 A1 | 4/2007 | Ryan et al. |
| 2007/0288402 A1 | 12/2007 | Collings |
| 2008/0262978 A1 | 10/2008 | Collings et al. |
| 2010/0100353 A1 * | 4/2010 | Sasaki .......................... 702/158 |

* cited by examiner

SYSTEM AND METHOD FOR DIMENSIONAL RATING OF MAIL PIECES

FIELD OF THE INVENTION

The present invention relates to mailings systems and more particularly to systems and methods for dimensionally rating mail pieces.

BACKGROUND OF THE INVENTION

Many companies throughout the United States use the delivery services of the United States Postal Service (USPS) to deliver mail pieces including cards, letters, flats, mailers, parcels and packages to their customers and potential customers. The mail pieces may include transactional mail, delivered goods and/or direct mail advertisements. Similarly, individuals use the delivery services of the USPS to deliver mail pieces to individuals and businesses around the country. Many countries, including the United States and the United Kingdom rate certain mail pieces at least partially based upon the physical dimensions (e.g., including shape) of the mail pieces.

Manual methods for determining dimensions such as by using rulers can be time consuming and lead to errors both in the subjective reading of a measurement and in the transcribing of a measurement. Existing automated dimensional measurement systems such as large commercial laser based package dimension scanners tend to be large, expensive, and not easily scalable. Items that do not have common geometric shape can be particularly difficult to measure accurately. Mail pieces that are not rated accurately can be delayed, returned and/or subject to additional charges in the form of re-paying postage and potential fines that could be levied by carriers. Moreover, mail processing systems such as mailing machines including postage meters typically expeditiously process many thin mail pieces such as postcards and envelopes including letters and flats. Certain of those mailing machines are equipped to measure certain of the dimensional measurements of those mail pieces, but are limited to measuring those that fit in the transport mechanism of the mailing machines.

Additionally, the carriers may utilize dimensional rating standards and measurement definitions that vary from one carrier to another and that may be difficult for a user to comply with. For example, the USPS utilizes several categories of mail and several classes of mail each combination of permissible category and class having certain parameters used in determining the rate applicable. The parameters may include shape, size limits, weight, destination zone or distance or a combination thereof. The USPS publishes physical requirements and pricing information in the USPS Domestic Mail Manual (DMM) and its Prices and Fees schedules. For First-Class Mail, the shape and weight of the mail piece determine the rate. For Express Mail, the weight of the mail piece always determines the rate, except for items mailed in Express Mail Flat-Rate Envelopes. For Priority Mail that weighs more than 1 pound, the rate is based on a combination of weight, shape, and how far the mail piece is traveling.

The USPS generally defines five mail processing categories for mail pieces: letter, flat, machinable parcel, irregular parcel, and outside parcel. The USPS assigns each mail piece to one of these categories based on the physical dimensions and characteristics of the mail piece using the longest dimension as the length, regardless of the placement or orientation of the delivery address on the piece. For some mail piece categories, such as letters, the USPS then redefines the length of a mail piece for rating purposes as the side that is parallel to the address block (regardless of the orientation of the mail piece). For flats and parcels, the USPS always defines the length as the longest side of the mail piece. The USPS utilizes measurements of "length" and "girth" to dimensionally rate certain packages. Once the length and girth are known, the rate for a particular class of service may be determined using an appropriate look up table. Other carriers, such as, for example, the United Kingdom's Royal Mail, specify that the length of each mail piece is always the longest side of the mail piece (regardless of the orientation of the mail piece). Current dimensional rating systems may not adequately handle such dimensional rating requirements.

Accordingly, there are several disadvantages of currently available systems and methods for dimensionally rating mail pieces.

SUMMARY

The illustrative embodiments of the present application describe mailings systems and more particularly describe systems and methods for dimensionally rating mail pieces including cards, letters, flats, mailers, packages and parcels using a pointing device such as a digital pen.

In one illustrative configuration, a system and method for dimensionally rating mail pieces is described. The system includes a digital pen, a three dimensional digital pen pattern device, a computer and a printer for printing evidence of postage payment. A mail piece such as a small parcel is placed on the opened three dimensional digital pen pattern device. The user may select a digital pen pattern command box or may otherwise engage or be prompted to begin measurements. For a rectangular parcel, the user selects a bottom right and then a top left measurement point. The system then calculates the dimensions of the parcel, dimensionally rates it and then accounts for and prints a corresponding postage indicium.

In another illustrative configuration, a system and method for dimensionally rating mail pieces is described. The system includes a digital pen and a three dimensional digital pen pattern device mounted on a scale having a flip top. The system may utilize a computer and a printer for printing evidence of postage payment or a collocated mailing machine to process the rating and postal indicium printing functions required. A mail piece such as a small parcel is placed on the scale on the opened three dimensional digital pen pattern device. After a stable weight is measured, the user is prompted to begin measurements. For an odd shaped parcel, the user is prompted for one length measurement and then prompted to trace or touch corners along the circumference of the mail piece adjacent to the top of the three dimensional digital pen pattern device. The system then calculates the dimensions of the parcel, dimensionally rates it and then accounts for and prints a corresponding postage indicium.

In yet another illustrative configuration, a system and method for dimensionally rating mail pieces is described. The system includes a digital pen and a three dimensional digital pen pattern device mounted on a mailing machine platform scale having a flip top. When the mailing machine scale flip top is opened, the dimensional rating routine begins. A mail piece such as a small parcel is placed on the scale on the opened three dimensional digital pen pattern device. After a stable weight is measured, the user is prompted to begin measurements. The system then calculates the dimensions of the parcel, dimensionally rates it and then accounts for and prints a corresponding postage indicium.

Several additional alternative configurations are also described below.

BRIEF DESCRIPTION OF THE DRAWINGS

The accompanying drawings illustrate several embodiments of the application, and together with the general description given above and the detailed description given below, serve to explain certain principles of the invention. As shown throughout the drawings, like reference numerals designate like or corresponding parts.

DETAILED DESCRIPTION

The illustrative embodiments of the present application describe mailings systems and more particularly describe systems and methods for dimensionally rating mail pieces including cards, letters, flats, mailers, packages and parcels using a pointing device such as a digital pen.

There are many different types of mail processing systems used to finish mail pieces, ranging from relatively small units that handle only one mail piece at a time, to large, multifunctional units that can process thousands of mail pieces per hour in a continuous stream operation. The larger mailing machines often include different modules that automate the processes of producing mail pieces including a singulating module, a moistening/sealing module, a transport mechanism, a weighing module, and a metering module. The mailing machines may include a module providing dimensional rating capability for pieces fed through the mailing machines feed path such as those described in commonly-owned, co-pending U.S. patent application Ser. No. 11/788,677, entitled "Mail Processing System Including Dimensional Rating With True Length Support", filed on Apr. 20, 2007 by Collings, et al., the application incorporated by reference herein in its entirety.

Figure 1:
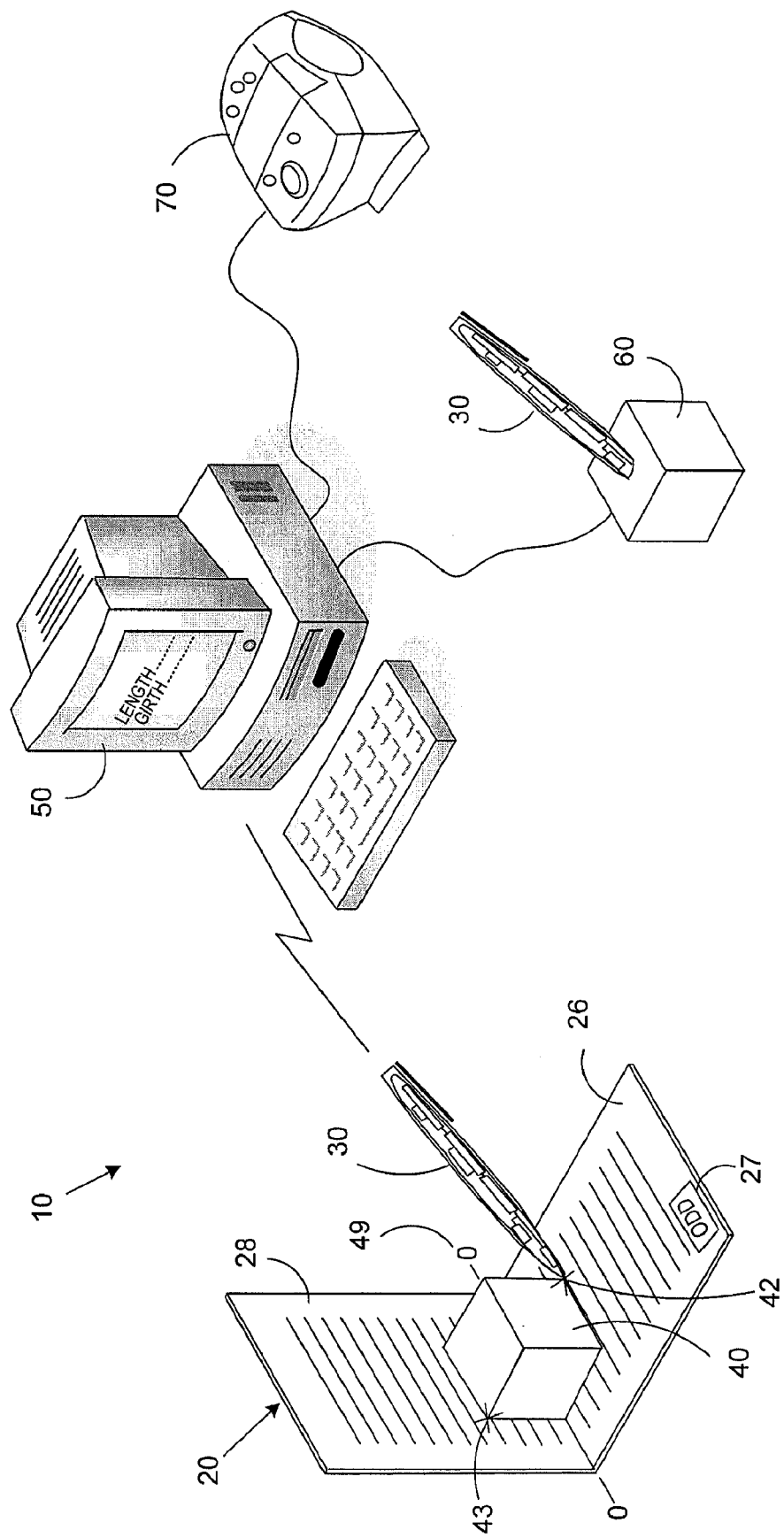
FIG. 1 is a schematic diagram of a system for dimensionally rating mail pieces using a digital pen according to an embodiment of the present application.

Referring to FIG. 1, a schematic diagram of a customized system 10 for making measurements and dimensionally rating mail pieces using a digital pen 30 is shown. A pointing device measurement apparatus is provided. Here, a digital pen 30 is used as the pointing device and a digital pen pattern device is used as a measurement platform for the pointing device measurement apparatus. Here, the pointing device measurement system is a digital pen measurement apparatus using a digital pen pattern mounted on a carrier. In this embodiment, the digital pen 30 comprises a Sony-Ericsson CHA-30 CHATPEN and the digital pen pattern is an ANOTO paper pattern available from Anoto AB of Sweden. In an alternative, the FLY PENTOP COMPUTER available from LeapFrog Enterprises, Inc. of Emeryville, Calif. may be used as the digital pen and voice user interface. Other pointing devices and other digital pen systems may be utilized as alternatives in the embodiments described herein. Instead of a digital pen pattern, other digital pen sensing systems may be used. The system includes a USB dock 60 for the digital pen 30. Additionally, digital pen 30 may be in direct wireless communication with computer 50 and/or printer 70 such as by using an internal BLUETOOTH transceiver. Thus the measurement points and any command selections may be communicated in real time across a wireless channel or transferred after a docking operation with dock 60 and computer 50.

The digital pen pattern measurement apparatus 20 comprises a top sheet 28 and bottom sheet 26 of digital pen pattern comprising ANOTO paper printouts. They are mounted on two flat rigid objects such as boards that are placed at a 90 degree angle to facilitate three dimensional measurements as described herein. The digital pen pattern measurement apparatus 20 may include two digital pen pattern paper sheets laminated on each of a vertical and horizontal side of a hinged rigid carrier and calibrated to use hinge point 49 as a zero point for the measurement device. The digital pen pattern measurement apparatus 20 optionally includes an Odd Measurement command selection box 27. The hinged rigid carrier may include plastic sheets or other suitable rigid material that may be unmovable or may be separable connected and not hinged. However, in another alternative, the measurement apparatus 20 comprises a single printed sheet of ANOTO paper having a crease with a defined 0 point 49.

In this illustrative example, printer 70 comprises the STAMP EXPRESSIONS Thermal customized postage printer system available from Pitney Bowes Inc. of Stamford, Conn. The printer 70 prints thermal media customized postage indicium labels that may be affixed to mail pieces such as parcel 40 as evidence of postage payment. The collocated computer 50 comprises a DELL PRECISION M6300 computer running the WINDOWS operating system and having Universal Serial Bus connections including a connection to the printer 70 and the digital pen dock 60. The computer 50 is optionally connected to a network such as the Internet and may be used to remotely in a remote postage system. The computer 50 includes digital pen coordinate processing logic, memory tables for storing the business logic and rating tables to apply dimensional rating as needed when considering the mail piece category, class, weight, destination and dimensions. Additionally, the computer 50 may be connected to a network such as the Internet and some of those functions obtained from a remote processor across a network.

For parcels, length is defined as the distance of the longest dimension and girth is the distance around the thickest part. A mail piece such as a small parcel is placed on the opened three dimensional digital pen pattern device. The user may select a digital pen pattern command box or may otherwise engage or be prompted to begin measurements. For a rectangular parcel, the user selects a bottom right and then a top left measurement point. The system then calculates the dimensions of the parcel by capturing the 2D ANOTO coordinates for each point and then using the known coordinates of the zero point, calculates the horizontal and vertical measurements. For example 1 inch=86 digital pen pattern dots. In this application for a parcel, the longer side is considered the length regardless of the orientation of the digital pen pattern device and the girth is determined to be the circumference around the parcel (a rectangular prism) perpendicular to the length ((2×width)+ (2×height)). The system then dimensionally rates the mail piece and then accounts for and prints a corresponding postage indicium using any other required inputs such as weight and destination. The digital pen 30 may provide voice instructions to the user such as touch the bottom right corner now and touch the top left corner now. The digital pen can then provide haptic feedback after the point touched is captured. If the user realizes that the wrong point was recorded, the user may select a redo function using the digital pen 30 or computer 50.

As described, in order to measure a mail piece, the operator places the mail piece on the measurement apparatus, flush against both the horizontal and vertical boards. For a regularly sized object, such as a rectangular prism, the operator only needs to make two marks on the ANOTO paper pattern with an ANOTO pen, one each at the far opposite corners from each other (for instance, far right corner of the mail piece on the horizontal board and far left corner of the mail piece on the vertical board). Irregularly shaped objects may require more marks to ensure the longest, tallest, and widest dimensions are recorded. When the operator docks and synchronizes the pen data to the computer, the system software converts the marked points on the paper to dimensions. The system software can then perform the dimensional rating or feed these dimensions into other systems or equipment that can compute the dimensional rate such as by combining the dimensions with other data such as weight and destination. For irregular packages an arm could be incorporated in the rigid digital pen pattern support that works like the measurement device attached to at doctor's office scale. Here the arm is brought down to touch the top of the package and used as a guide to help the user establish the correct position to mark. Since some mail pieces will require more than two marks on the apparatus, the software cannot assume that two marks is a breaking point between mail pieces. To measure multiple pieces, the operator can check a box on the ANOTO paper indicating that one piece is finished and another will begin or make a user interface selection on the computer 50.

As can be appreciated, a system according to the present embodiment may provide a small, inexpensive and easy to use alternative system for dimensional rating of mail pieces. In an alternative embodiment applicable to any of the embodiments described herein, the system may accommodate a one point measurement system for square items. For example, if parcel 40 is known or approximated to be of a square shape, only one measurement point is needed due to the geometry of square shapes. The user selects a "Square" parcel setting such as by using digital pen 30 to select a command box on the digital pattern device or by using the collocated computer 50. Since parcel 40 is placed up against the inside measurement position of digital pattern device 20, the digital pen can be used to take one measurement such as at point 42 in order to determine the length of one side. Thereafter, the system is able to dimensionally rate the mail piece. For a rectangular shapes or when the parcel is not placed against the origin, measurements at two points such as points 42 and 43 are required.

For example, in another alternative embodiment applicable to any of the embodiments described herein, the system includes only a subset of the devices and may include alternative devices as described. Instead of a digital pen, the system may utilize a digital pointing device such as a mouse or remote control wand that provides 3D positioning information in absolute or relative terms. The only other device in the system is a digital printer connected to the digital pointing device and configured to rate the mail piece based upon input from the digital pointing device and to print the associated postage indicium. The user initiates the dimensional rating session, uses the digital pointing device to select one or more positions in space adjacent to the mail piece depending on the shape of the device as described herein and then receives the printed indicium from the printer. Additionally, the digital pen pattern device may be printed on one large sheet and folded, may be printed in two large separate sheets that are placed against a wall and floor or may be printed with multiple sheets in each direction that are placed adjacent to each other against a wall and floor or otherwise supported. The digital pen pattern surfaces may also be temporarily secured to the related supports and rolled up for storage when not in use.

In yet another alternative applicable to any of the embodiments described herein, the digital pen pattern device may be provided with a command clear box so that the system may be configured to deal with operator errors in marking the required points on the periphery of the mail piece. Moreover, two clear boxes may be provided. One to clear the last mark and a second to clear all marks. Each marking operation may be indicated by a audio, visual or haptic feedback from the pen or an audio or visual feedback from the computer. In yet another alternative applicable to any of the embodiments described herein, the digital pen 30 is configured with a sensing mode in which the pen tip is retracted so that the pen will not write on the digital pen pattern apparatus. A pointer may instead be deployed from the pen that maintains the appropriate distance for the optical sensor and provides for contact sensing with the pattern at the edge of the mail piece.

Furthermore, different digital pen technologies are commercially available and may be utilized. If a capacitive touch sensor digital pen system is utilized, then digital pen pattern device 20 may be replaced with an appropriate sensor device. Commonly-owned U.S. Pat. No. 7,167,586 B2, entitled, Method and system for remote form completion, issued Jan. 23, 2007 to Bruan, et al. describes the use of the ANOTO digital pen and associated digital pen pattern lookup system and also describes several other digital pen systems, the entire disclosure of which is incorporated herein by reference in its entirety.

Figure 2A:
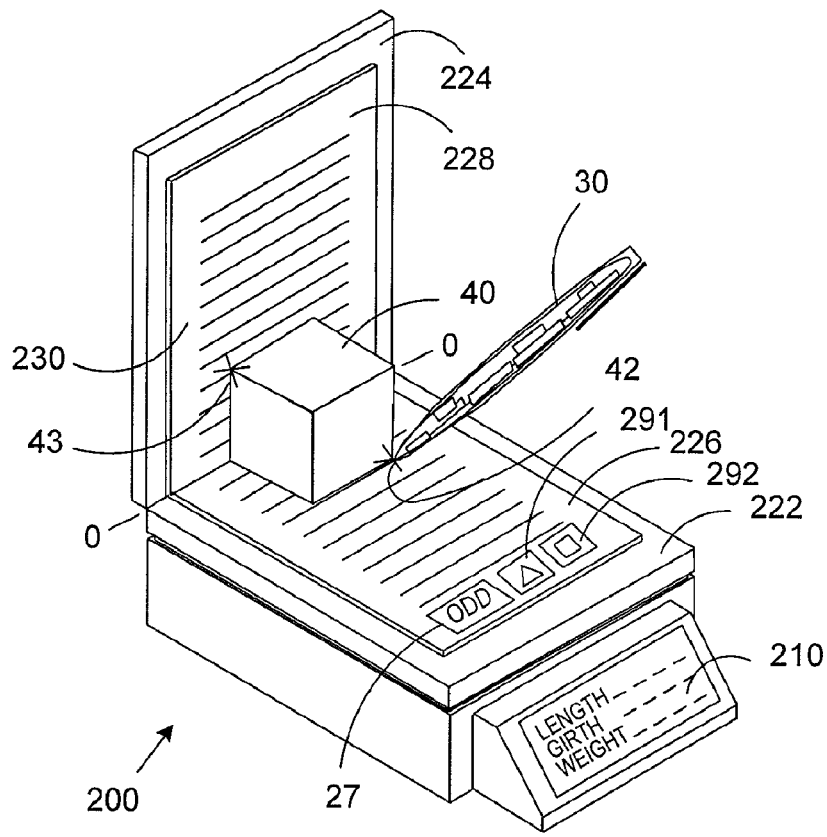
FIG. 2A is a schematic diagram of a scale for dimensionally rating mail pieces using a digital pen and scale according to an embodiment of the present application.

Referring to FIG. 2A, a schematic diagram of a scale for dimensionally rating mail pieces 200 using a digital pen and scale according to an embodiment of the present application is shown. With regard to FIG. 2A and FIG. 2B, the scale 200 comprises a modified postal scale that incorporates a flip-top three dimensional digital pen pattern device as described herein. The digital pen pattern comprises a printed sheet of digital pen pattern laminated to the inside surfaces of the flip top of the scale. The scale may comprise a modified INTEGRA SERIES Mailing and Shipping scale. The INTEGRA SERIES of mailing and shipping scales are available from Pitney Bowes Inc. of Stamford, Conn.

The system 200 includes a scale having a flip-top including a top surface 224 and a bottom surface 222 for mounting a digital pen pattern device 230 such as laminated sheets of ANOTO digital pen pattern paper. The top surface 224 includes a digital pen pattern surface 228 and the bottom surface includes a digital pen paper pattern surface 226. The scale includes a processor and a display 210. The digital pen 30 communicates with the scale processor using a wireless connection and/or a connected dock (not shown). The system may utilize a computer and a printer for printing evidence of postage payment or a collocated mailing machine to process the rating and postal indicium printing functions required. A mail piece such as a small parcel 40 is placed on the scale on the opened three dimensional digital pen pattern device. After a stable weight is measured, the user is prompted to begin measurements. Here, since the parcel under test is a rectangular prism, only two corner measurement points 42 and 43 are necessary. The user may input shape information into a collocated computer or may instead select a shape indicator such as 291, 292 or 27. In yet another alternative, the parcel 40 may include a barcode or other indicator that is read such as be moving the digital pen 30 over the barcode and such barcode provides the indication of the shape of the parcel 40.

Figure 2B:
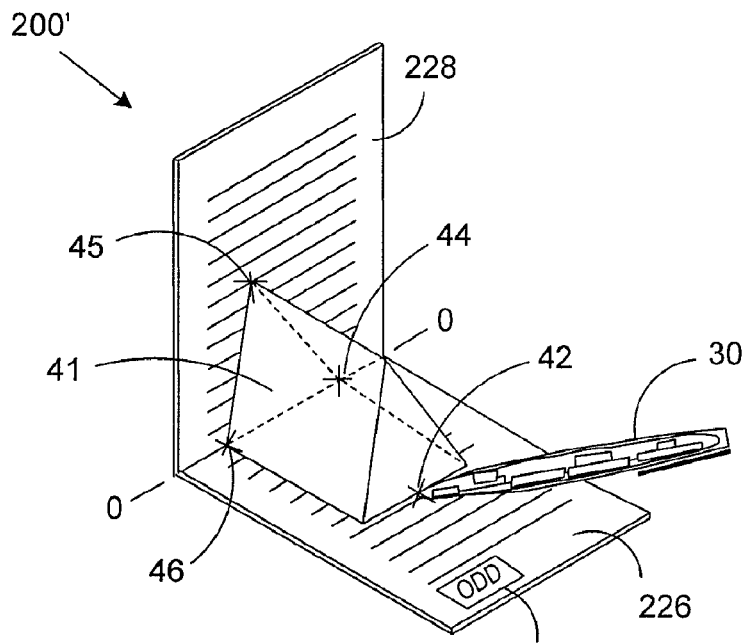
FIG. 2B is a partial schematic diagram of the scale of FIG. 2A according to an embodiment of the present application.

FIG. 2B is a partial schematic diagram 200' of the scale of FIG. 2A according to an embodiment of the present application. Here the parcel under test is a rectangular prism 41. A length measurement point 42 is provided to measure the length and points 44, 45 and 46 are used to measure the girth since the system prompted the user for a geometric volume selection and the user selected a rectangular prism. Here, the scale display is utilized to provide the user a selection of available geometric volumes for comparison so that the user can select the closest fit.

For known shapes, a shape selection indicator is utilized and an appropriate geometric formula is used with prompts to the user for measurements at required points on the geometric volume. For an odd shaped parcel, the user is prompted for one length measurement and then prompted to trace or touch corners along the circumference of the mail piece adjacent to the top of the three dimensional digital pen pattern device. The system then calculates the dimensions of the parcel, dimensionally rates it and then accounts for and prints a corresponding postage indicium. The scale processor includes digital pen processing logic, memory tables for storing the business logic and rating tables to apply dimensional rating as needed when considering the mail piece category, class, weight, destination and dimensions. Alternatively, the mailing machine may be connected to a collocated processor, collocated mailing machine or to a network and remote processor to obtain needed rating data tables or business rules.

Figure 3:
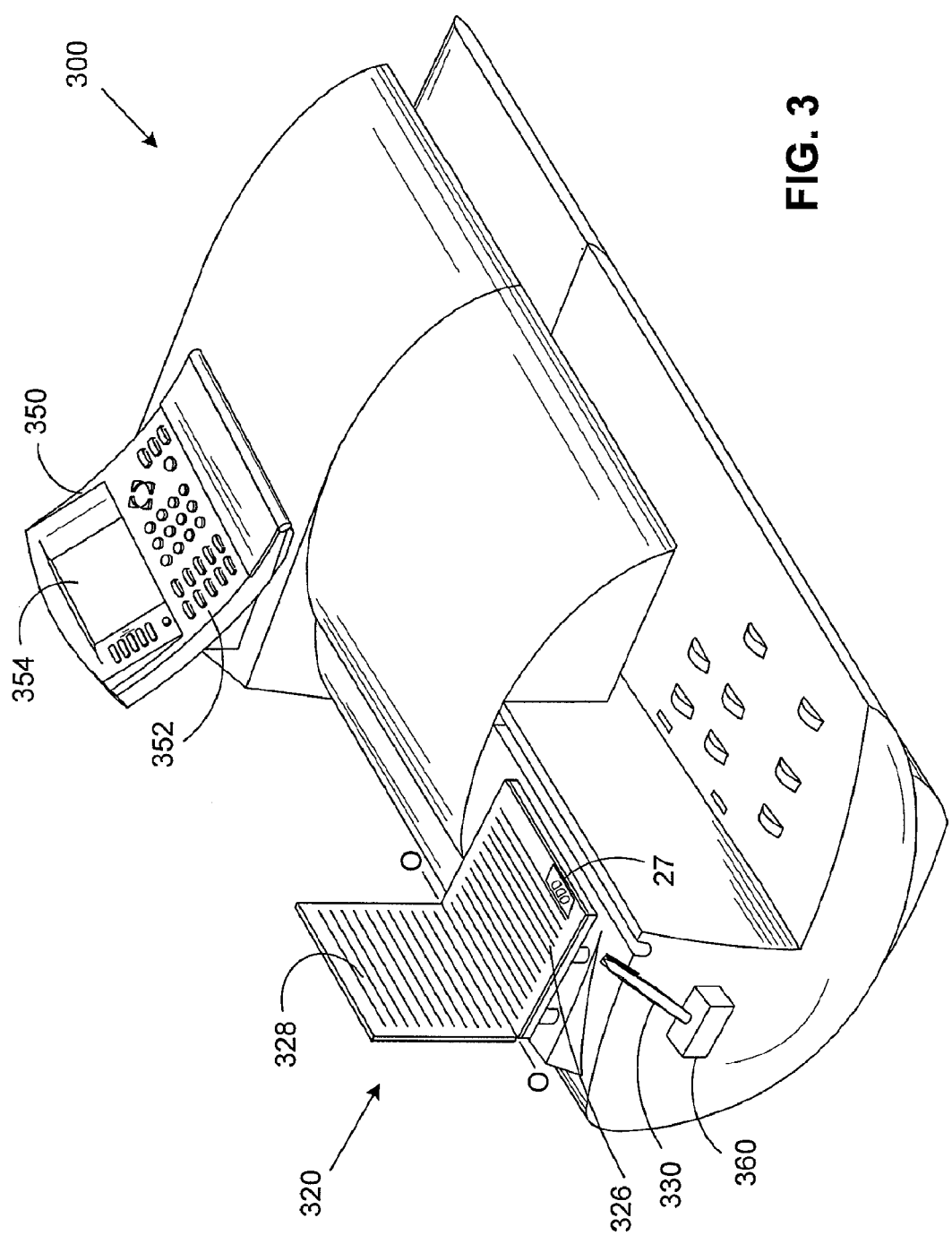
FIG. 3 is a schematic diagram of a mailing machine for dimensionally rating mail pieces using a digital pen and a mailing machine according to an embodiment of the present application.

Referring to FIG. 3, a schematic diagram of a mailing machine system 300 for dimensionally rating mail pieces using a digital pen and a mailing machine according to an embodiment of the present application is shown. The mailing machine system 300 comprises a modified DM800 SERIES mailing machine available from Pitney Bowes Inc. of Stamford, Conn. Here, the traditional platform sitting on a load cell is replaced with a flip top platform 320 having an upper 328 and lower 326 digital pen pattern surface when opened. The digital pen pattern surfaces 326, 328 may include digital pen pattern user command indicators such as Odd Shape command indicator 27. The system 300 includes a digital pen 330 and a flip top platform 320 acting as a three dimensional digital pen pattern device. The digital pen 330 is wirelessly connected to the system processor of mailing machine 300 and can also be docked in docking device 360. The mailing machine user interface 350 includes a keyboard 352 and display 354 used to communicate with the user. The user interface 350 may be configured to provide audio and/or visual prompts and feedback to the user. The digital pen may be configured to provide audio/visual and haptic prompts and feedback to the user.

When the mailing machine scale flip-top 320 is opened, a switch indication is provided to the mailing machine processor and the dimensional rating routine begins. A mail piece such as a small parcel is placed on the scale on the opened three dimensional digital pen pattern device. After a stable weight is measured, the user is prompted to begin measurements. The system then calculates the dimensions of the parcel, dimensionally rates it and then accounts for and prints a corresponding postage indicium on a postage tape. The mailing machine may alternatively include a DM400 SERIES mailing machine or other DM SERIES mailing machine such as the DM1000 mailing machine, all available from Pitney Bowes Inc. The mailing machine processor includes digital pen coordinate processing logic, memory tables for storing the business logic and rating tables to apply dimensional rating as needed when considering the mail piece category, class, weight, destination and dimensions. Alternatively, the mailing machine may be connected to a collocated processor or to a network and remote processor to obtain needed rating data tables or business rules.

Figure 4A:
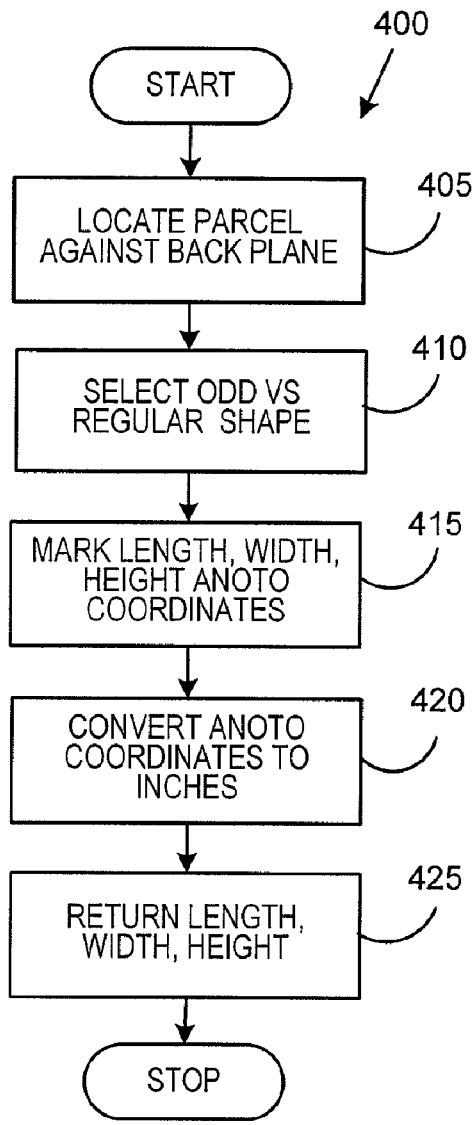
FIG. 4A is a flowchart showing an illustrative process for dimensionally rating mail pieces according to an embodiment of the present application.

Referring to FIG. 4A, a flowchart showing an illustrative process 400 for dimensionally rating mail pieces according to an embodiment of the present application is shown. The process 400 is suitable for use, for example, with the scale system shown in FIG. 2A. This example is for a dimensional rating measurement based upon length, weight and height. In step 405, the user places a parcel against the back plane of the digital pen pattern measurement device. The parcel does not necessarily have to be placed at the leftmost origin 0 point, but should be placed against the back plane for ease of measurement. In step 410, the system defaults to or the user selects a regular shape.

In step 415, assuming a rectangular prism parcel, the user marks the package at a first corner end point in the horizontal plane to provide one measurement and marks the package at the opposing corner end point in the vertical plane to provide the second required data point. Thereafter, in step 420, the system converts the digital pen pattern coordinate data into relative coordinates in order to convert the data points to measurements in inches. In step 425, the process returns the length, height and width as described herein. The system may return the measurements to a user via a display and may also use the measurements to return a rate calculation to the user. Alternatively, the process may provide the measurement data to another device such as a collocated computer or mailing machine.

Figure 4B:
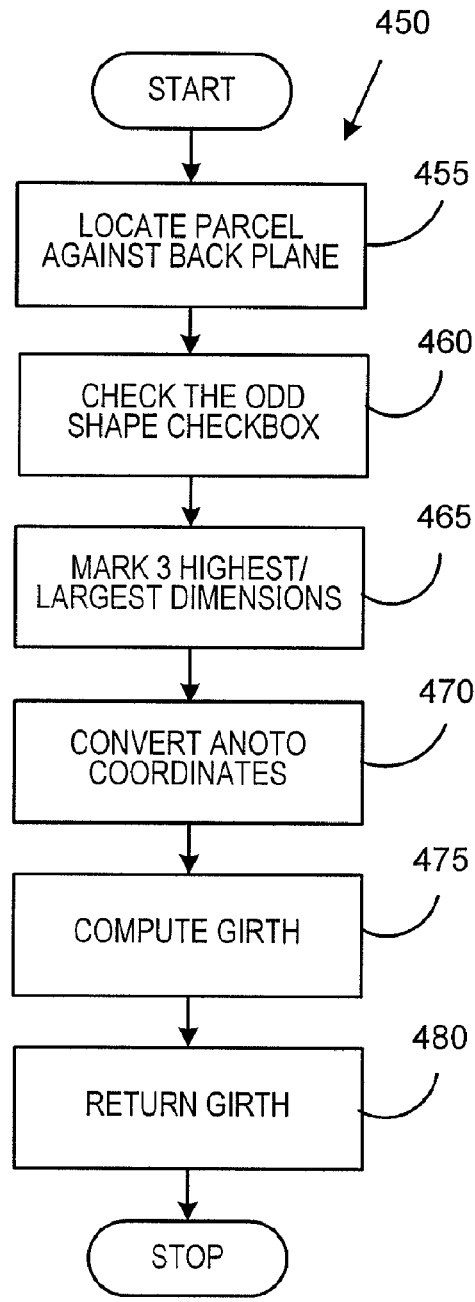
FIG. 4B is a flowchart showing an illustrative process for dimensionally rating mail pieces according to an embodiment of the present application.

Referring to FIG. 4B, a flowchart showing an illustrative process 450 for dimensionally rating mail pieces according to an embodiment of the present application is shown. The process 450 is suitable for use, for example, with the scale system shown in FIG. 2B. This example is for a dimensional rating measurement based upon length and girth. In step 455, the user places a parcel against the back plane of the digital pen pattern measurement device. The parcel does not necessarily have to be placed at the leftmost origin 0 point, but should be placed against the back plane for ease of measurement. In step 460, the user selects the odd shape command box. The user is prompted to place the longer side in the horizontal plane. If the calculation later shows that the user did not comply, an error is displayed and the user prompted to retry the measurements.

In step 465, the user is prompted to mark the three highest or largest dimensions in the vertical plane. Those points are used to estimate girth. However, the user may alternatively select a particular geometric volume. For example, assuming a triangular prism parcel, the user marks the package at a first corner end point in the horizontal plane to provide one measurement and marks the package at the three corner points in the vertical plane to provide the required data points to calculate girth. Additionally, in another alternative, the entire portion or the parcel accessible against the vertical wall may be traced to estimate the girth of the package.

Thereafter, in step 470, the system converts the digital pen pattern coordinate data into relative coordinates in order to convert the data points to measurements in inches. In step 475, the process estimates the girth as described. In step 480, the process returns the length and girth as described herein.

The system may return the measurements to a user via a display and may also use the measurements to return a rate calculation to the user. Alternatively, the process may provide the measurement data to another device such as a collocated computer or mailing machine.

Figure 5:
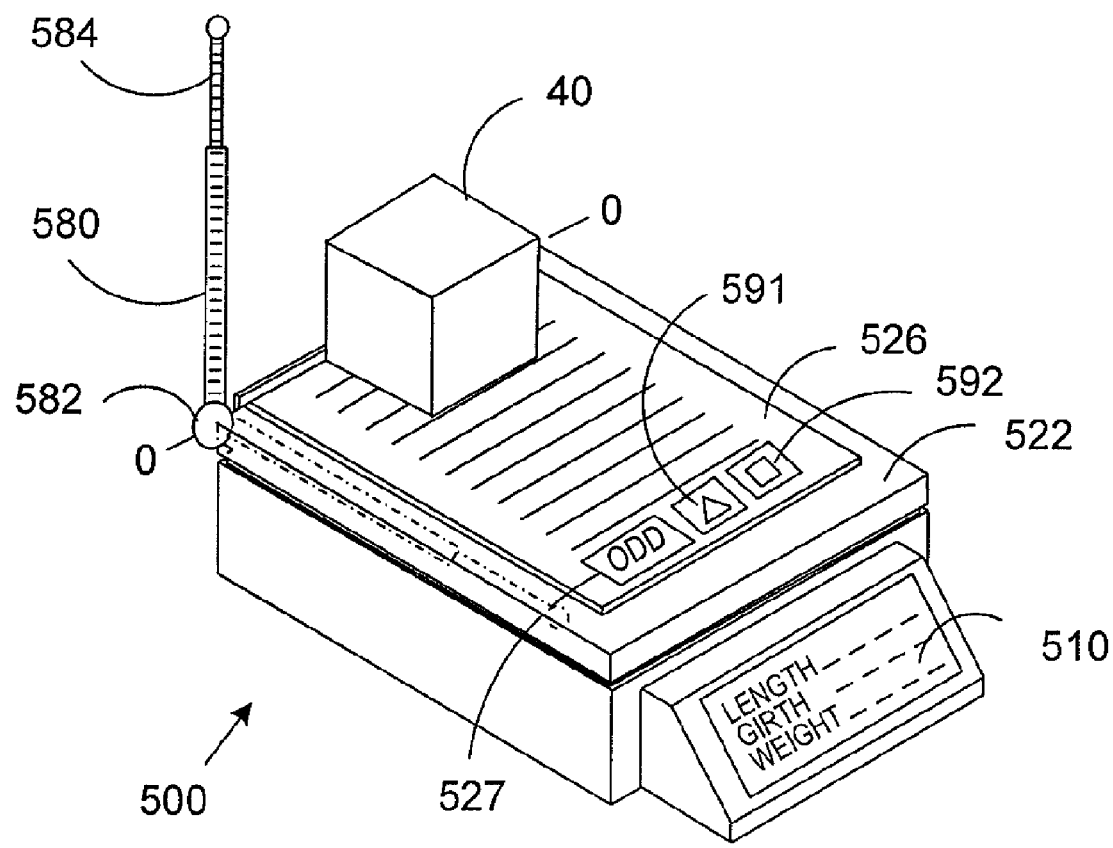
FIG. 5 is a schematic diagram of a scale for dimensionally rating mail pieces using a digital pen and scale according to an embodiment of the present application.

Referring to FIG. 5, a schematic diagram of a scale 500 for dimensionally rating mail pieces using a digital pen and scale according to an embodiment of the present application is shown. The scale may comprise a modified INTEGRA SERIES Mailing and Shipping scale similar to the modified scale shown in FIG. 2A. The scale 500 includes a scale having a bottom surface 522 for mounting a digital pen pattern device 522 such as laminated sheet of ANOTO digital pen pattern paper 526. The scale 500 includes a processor and a display 510. Here, the scale 500 includes a second digital pen pattern device in the form of a rigid pole or dowel 580 connected to the scale. In this illustrative embodiment, the rigid pole 580 is marked with digital pen pattern and mounted to the scale using a ball joint 582. A sensor (not shown) such as an optical sensor provides orientation feedback so that the scale knows the position of the pole 580. The rigid pole 580 may also include a telescoping section 584 that is also marked with digital pen pattern and that may be extended to measure items that are larger that the first digital pen pattern device 526.

The digital pen (not shown) communicates with the scale processor using a wireless connection and/or a connected dock (not shown). The system may utilize a computer and a printer for printing evidence of postage payment or a collocated mailing machine to process the rating and postal indicium printing functions required. A mail piece such as a small parcel 40 is placed on the scale on the first digital pen pattern device 526. After a stable weight is measured, the user is prompted to begin measurements. Here, since the parcel under test 40 is a rectangular prism, the user may select shape indicator 592 and only two corner measurement points are necessary. The parcel 40 is moved against the mount 582 and the vertical measurement is taken using rigid pole 580. Similarly, the second measurement may be taken with the rigid pole 580 moved down into a horizontal position or by using the first digital pattern device 526. For other parcels, shape indicator 591 for triangular prisms or shape indicator 527 for odd shapes may be selected. The rigid pole 580 may be rotated to take measurements in each of the three Cartesian coordinate axes or even to take off axis measurements. The user may input data indicating which axis is being measured or the system may instead measure the orientation of the rigid pole 580. In yet another alternative, the rigid pole 580 is removable from a mount and may be used to measure an item at a short distance from the scale.

In an alternative applicable to any relevant embodiment herein, the horizontal and vertical surfaces may be at somewhat less or more than a ninety degree angle such as between 85-95 degrees or more from 90. The system may then be calibrated to provide accurate measurements despite the error from the preferred 90 degree angle.

The databases described may use an available relational database such as ORACLE 12i or MICROSOFT SQL server. Moreover, any or all of databases or servers described may be resident in a single server or may be geographically distributed. The processes described herein may be implemented in C++ on a MICROSOFT WINDOWS XP platform.

While several embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A dimensional rating system for providing dimensional rating measurement data regarding a mail piece comprising:
   a digital pen sensing device having a first portion with a first surface and a second portion with a second surface, wherein the first portion operatively connected to the second portion at an approximately ninety degree angle;
   wherein the first surface and the second surface comprise a digital pen sensor;
   a digital pen for obtaining a plurality of measurement data points using the digital pen sensing device; and
   a computer having a dimensional rating lookup table, the computer configured for receiving the measurement data points and for determining dimensional rating measurement data for the mail piece using the dimensional rating lookup table, wherein the computer receives the measurement data points from the digital pen, and wherein,
   the dimensional rating system estimates the girth of the mail piece using a plurality of measurement data points obtained from measuring the mail piece adjacent to at least one of the first and second surfaces.

2. The dimensional rating system of claim 1, further comprising:
   a printer operatively connected to the computer for printing postage indicium based upon the dimensional rating measurement data.

3. The dimensional rating system of claim 2, wherein, the computer is operatively connected to the digital pen using a wireless communications channel.

4. The dimensional rating system of claim 2, wherein, the computer is operatively connected to the digital pen using a docking station and whereby the computer receives the plurality of measurement data points after all of the plurality of measurement data points have been measured using the digital pen.

5. The dimensional rating system of claim 1, wherein, the digital pen sensor comprises a digital pen pattern.

6. The dimensional rating system of claim 1, wherein, the mail piece is a parcel having a shape that is approximately a rectangular prism;
   the first surface is displaced in a horizontal plane and the second surface is displaced in a vertical plane;
   the computer is configured to determine a length of a mail piece using one of the plurality of measurement data points received associated with a measurement taken by the digital pen on the first surface corresponding to a first corner of the mail piece;
   the computer is configured to determine a width of a mail piece using one of the plurality of measurement data points received associated with a measurement taken by the digital pen on the second surface corresponding to a second corner of the mail piece, wherein the second corner of the mail piece is diagonally opposed to the first corner.

7. The dimensional rating system of claim 6, wherein, the system provides audio prompts for a user to take the measurements at the first and second corners of the mail piece.

8. The dimensional rating system of claim 2, wherein, the computer is resident in the printer.

9. A scale for providing weight and dimensional rating measurement data regarding a mail piece comprising:

a scale platform having a digital pointing sensing device having a first portion with a first surface and a second portion with a second surface, wherein the first portion is pivotally connected to the second portion and may be configured at an approximately ninety degree angle;

wherein the first surface and the second surface comprise a digital pointing device sensor;

a digital pointing device for obtaining a plurality of measurement data points using the digital pointing sensing device; and a processor having a dimensional rating lookup table, the processor configured for receiving the measurement data points and for determining dimensional rating measurement data for the mail piece using the dimensional rating lookup table, wherein the processor receives the measurement data points from the digital pen, wherein:

the first portion has a back surface;

the first portion may be pivoted to adjacent the second portion so that the first surface is flush against the second surface; and the back surface accepts mail pieces for weighing.

10. The scale of claim 9, further comprising:

a weight sensor operatively connected to the scale platform for obtaining weight data associated with the mail piece; and a display operatively connected to the processor for displaying the weight data and the dimensional rating measurement data.

11. The scale of claim 10, wherein:

the digital pointing device comprises a digital pen and the digital pointing sensing device comprises a digital pen pattern sensing device.

12. The scale of claim 11, wherein:

the scale further comprises a second digital pointing sensing device, wherein the second digital pointing device includes a rigid pole marked with digital pen pattern.

13. The scale of claim 9, wherein:

the scale enters a dimensional rating mode when the first surface is pivoted to a position approximately 90 degrees from the second surface.

14. The scale of claim 9, wherein:

the scale estimates the girth of the mail piece using a plurality of measurement data points obtained from the mail piece edges adjacent to the first surface.

15. A mailing machine having a platform scale for dimensionally weighing a mail piece comprising:

the platform scale having a digital pen sensing device having a first portion with a first surface and a second portion with a second surface, wherein the first portion is pivotally connected to the second portion and may be configured at an approximately ninety degree angle;

wherein the first surface and the second surface comprise a digital pen device sensor;

a digital pen device for obtaining a plurality of measurement data points using the digital pen sensing device; and a processor having a dimensional rating lookup table, the processor configured for receiving the measurement data points and for determining dimensional rating measurement data for the mail piece using the dimensional rating lookup table, wherein the processor receives the measurement data points from the digital pen, and wherein the mailing machine estimates the girth of the mail piece using a plurality of measurement data points obtained from measuring the mail piece adjacent to at least one of the first and second surfaces.

16. The mailing machine of claim 15, further comprising:

a weight sensor operatively connected to the platform scale for obtaining weight data associated with the mail piece; and a printer for printing postage indicium labels based upon the dimensional rating measurement data and the weight.

17. The mailing machine of claim 15, wherein:

the platform scale enters a dimensional rating mode when the first surface is pivoted to a position approximately 90 degrees from the second surface.

18. The mailing machine of claim 15, wherein:

the first portion has a back surface;

the first portion may be pivoted to adjacent the second portion so that the first surface is flush against the second surface; and the back surface accepts mail pieces for weighing.

19. The mailing machine of claim 15, wherein:

the processor is operatively connected to the digital pen using a wireless communications channel.

20. The dimensional rating system of claim 1, wherein:

the first portion has a back surface;

the first portion may be pivoted to adjacent the second portion so that the first surface is flush against the second surface; and the back surface accepts mail pieces for weighing.

* * * * *